US005465872A

United States Patent [19]

Gueret

[11] Patent Number: 5,465,872

[45] Date of Patent: Nov. 14, 1995

[54] PRODUCT DISPENSING UNIT WITH MOVABLE DISPENSING DEVICE AND CAP

[75] Inventor: Jean-Louis H. Gueret, Paris, France

[73] Assignee: L'Oreal, Paris, France

[21] Appl. No.: 222,389

[22] Filed: Apr. 4, 1994

[30] Foreign Application Priority Data

Apr. 28, 1993 [FR] France .................................. 93 05029

[51] Int. Cl.[6] .............................. B67D 5/42; G01F 11/02

[52] U.S. Cl. ........................... 222/95; 222/105; 222/207; 222/325; 222/538; 222/464.1

[58] Field of Search ............................ 222/95, 105, 321, 222/207, 209, 325, 326, 380, 383, 385, 494, 464, 383.1, 321.1, 321.7, 538

[56] References Cited

U.S. PATENT DOCUMENTS

| | | | |
|---|---|---|---|
| 3,090,529 | 5/1963 | Lipman | 222/209 |
| 3,211,340 | 10/1965 | Zander et al. | 222/95 |
| 3,485,419 | 12/1969 | Taylor | 222/380 X |
| 5,125,539 | 6/1992 | Schneider | 222/209 X |
| 5,176,291 | 1/1993 | Fillmore et al. | 222/325 X |
| 5,271,432 | 12/1993 | Gueret | 222/207 X |
| 5,292,033 | 3/1994 | Gueret | 222/95 |
| 5,305,921 | 4/1994 | Kock et al. | 222/95 |
| 5,360,145 | 11/1994 | Gueret | 222/105 X |
| 5,370,272 | 12/1994 | Gueret | 222/95 |
| 5,388,728 | 2/1995 | Gueret | 222/105 |

FOREIGN PATENT DOCUMENTS

| | | |
|---|---|---|
| 0524854 | 1/1993 | European Pat. Off. . |
| 2400124 | 3/1975 | France . |
| 2554088 | 5/1985 | France . |

*Primary Examiner*—Kevin P. Shaver
*Attorney, Agent, or Firm*—Staas & Halsey

[57] ABSTRACT

Unit for dispensing a product of liquid or pasty consistency, including a receptacle for the product consistency, including a receptacle for the product equipped with a base intended to receive a dispensing device. The base and the dispensing device have complementary securing members which enable the base and the dispensing device to be connected and disconnected. The unit also includes a cap having securing members which are identical to the securing members of the base, so that the dispensing device and the cap can be connected to form a dispensing subunit.

24 Claims, 1 Drawing Sheet

PRODUCT DISPENSING UNIT WITH MOVABLE DISPENSING DEVICE AND CAP

BACKGROUND OF THE INVENTION

The subject of the present invention is a unit for dispensing a product, in particular a liquid or pasty product.

Various types of product dispensers are known, in particular dispensers including a receptacle for the product which is equipped with a base carrying a dispensing device secured to the base by mechanical means.

These dispensers may be used often, for example at least once a day. This is particularly the case when the product to be dispensed is a cosmetic product. The dimensions of these dispensers make them bulky and hence inconvenient to transport in a toiletry bag when the user is away from his/her home for a while, for example for one or two days at the weekend.

SUMMARY OF THE INVENTION

The object of the present invention is to overcome this problem. Its subject is a dispensing unit including a receptacle for the product of liquid or pasty consistency which is equipped with a base intended to receive a dispensing device, the base and the dispensing device having complementary securing means which enable the base and the dispensing device to be connected and disconnected, the dispensing unit including a cap including securing means which are identical to the securing means of the base, so that the dispensing device and the cap can be connected to form a dispensing subunit.

The cap is advantageously fitted removably on the receptacle.

According to one embodiment, the receptacle includes a rigid container and a flexible bag welded to the base which is itself connected to the container; the cap is fitted removably on the bottom of the container, the bottom and the cap include complementary fastening means.

The dispensing device is advantageously a diaphragm pump; the pump includes a rigid piece, an elastic diaphragm and a rigid cover forming a constraining device, the diaphragm being sandwiched between the rigid piece and the cover.

The pump preferably carries a cylindrical skirt which, together with the base, defines a first chamber which connects with the inside of the bag via holes; the skirt is surrounded by a neck of the base, the securing means being carried by the neck and the skirt respectively.

The diaphragm forms, at its center, a dome which, together with the rigid piece, defines a second chamber which connects with the first chamber via holes formed in the rigid piece; a one-way valve is advantageously arranged in line with the holes.

The rigid piece has an inclined part in which a channel has been cut, and the diaphragm ends in a bevel so as to form a lip which interacts with the inclined part, the lip covering the channel as far as its outer end which it closes, the inner end of the channel opening out into the second chamber.

A cover is preferably provided to close the base (the pump having been removed from the base), the cover being equipped with tongues designed to interact with the periphery of the diaphragm of a one-way valve arranged in line with the holes of the base so as to apply the diaphragm against its seat, so that the bag and its base equipped with the cover form a storable product refill.

BRIEF DESCRIPTION OF THE DRAWINGS

In order to make the subject of the invention more readily understandable, an embodiment, shown in the attached drawings, will now be described by way of non-limiting example and purely as an illustration.

In these drawings.

DESCRIPTION OF THE PREFERRED EMBODIMENTS

Figure 3:
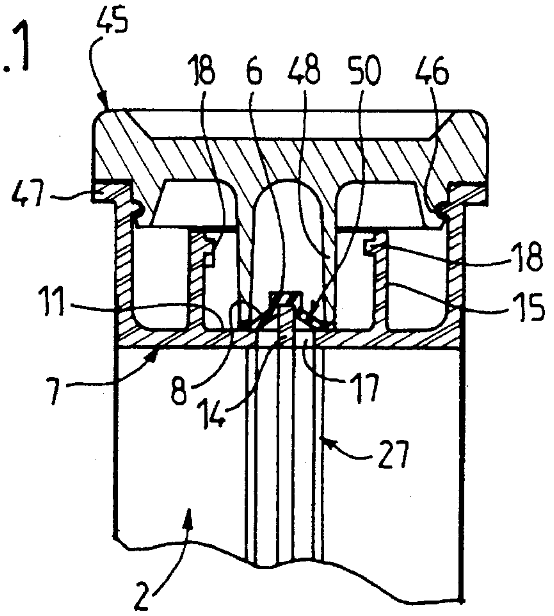
FIG. 3 is a view in partial section of a product refill for the unit in FIG. 1.

FIG. 3 shows part of a bag 2 made from deformable material welded to a rigid base 7; the base 7 is dish-shaped with the concave side furthest from the bag 2; the base 7 is equipped, inside and at the centre of the dish, with a neck 15 combined with a partially elastic element 50 to form a one-way opening valve; the element 50 includes a part 6 which fastens on to a finger 14 integral with the base 7, and an elastic part 8 in the form of a frustoconical diaphragm which bears elastically against a bottom 11 of the base 7; holes 17 formed in the bottom 11 of the base 7 in line with the valve 50 allow the product to leave the bag 2, but the diaphragm 8 of the valve prevents it from doing so unless a pressure is exerted on the walls of the bag; a cover 45 has, on the one hand, fastening means 46 interacting with complementary fastening means provided on a circular rim 47 of the base 7 and, on the other hand, axial tongues 48 which extend as far as the periphery of the diaphragm 8 so that, when the cover 45 is placed on the base 7, pressure is exerted on the periphery of the diaphragm 8 applied against its seat formed by the bottom 11 of the base 7. In this way, none of the product contained in the bag 2 is allowed to escape, even if pressure is exerted on the bag 2; this arrangement makes it possible to form a product refill which can be stored, the bag remaining full of product.

Figure 1:
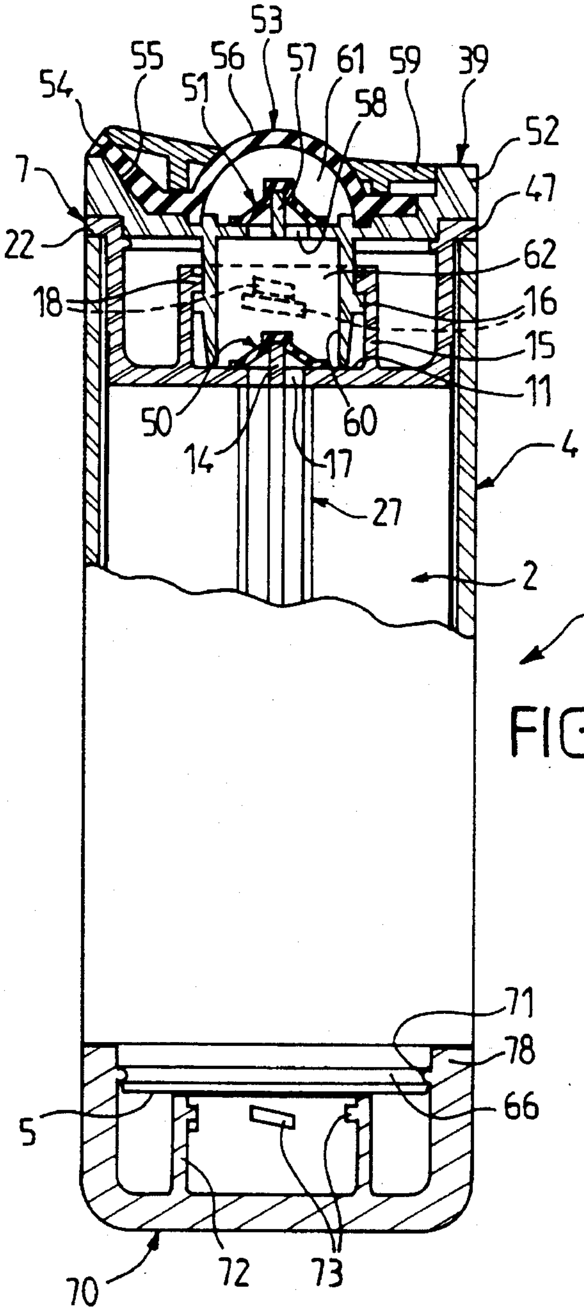
FIG. 1 shows, in a partial section, a dispensing unit according to the invention.
Figure 2:
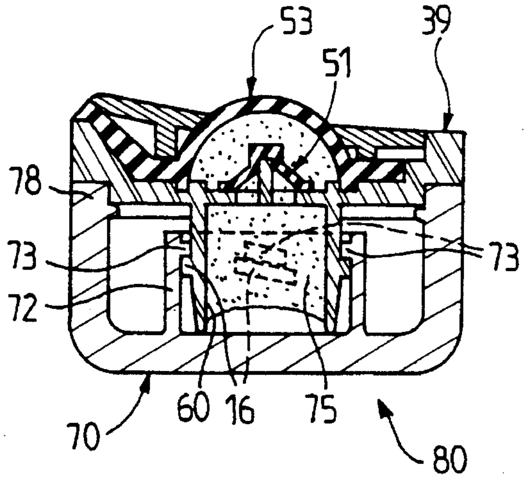
FIG. 2 shows, in section, a subunit formed from elements of the unit in FIG. 1.

FIG. 1 shows a dispensing unit 1 employing the refill in FIG. 2; after the cover 45 has been removed from the base 7, the refill is inserted into a cylindrical rigid container 4 with a cross-section which may be other than circular, for example oval. The rim 47 of the base 7 forms a collar which can interact with the rim 22 of the container 4 in its upper part. The base 7 and the container 4 are connected using any appropriate means, not illustrated, for example by snap-fastening. A diaphragm pump 39, as known per se, is placed on the base 7 to which it is secured by securing means 18 carried by the neck 15 of the base 7, the pump itself carrying complementary securing means 16. The securing means may, of course, be of any type; in the example illustrated in the figures, they include four helical inclined portions; the pump 39 carries a cylindrical skirt 60 which, together with the base 7, defines a first chamber 62 which connects with the inside of the bag 2 via holes 17; the skirt 60 surrounds the neck 15, and the complementary securing means 16 of the pump are carried by the skirt 60.

Figure 4:
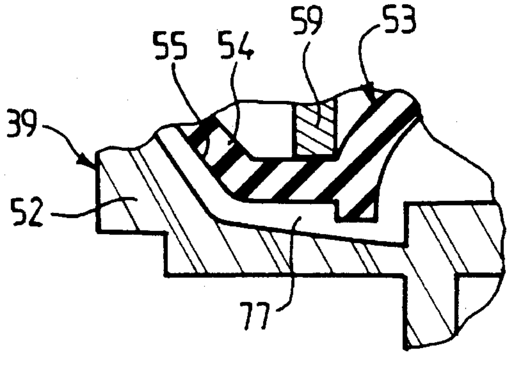
FIG. 4 is a detail, in partial section, of FIG. 1.

The diaphragm pump 39 includes a rigid piece 52, an elastic diaphragm 53 and a cover 59 forming a constraining device, the diaphragm 53 being sandwiched between the rigid piece 52 and the cover 59. The rigid piece 52 has an inclined part 55 in which a channel 77 has been cut, as can be seen more clearly in FIG. 4. The diaphragm 53 ends in a bevel so as to form a lip 54 which interacts with the inclined part 55 of the rigid piece 52, forming a seat; the lip 54 covers the channel 77 as far as its outer end where it closes it. At its center, the diaphragm 53 forms a dome 56 which defines a second chamber 61 forming a variable volume for the product above the rigid piece 52. The inner end of the channel 77 opens out into the second chamber 61. The cover 59 is provided with a central hole via which the dome 56 is accessible. The second chamber 61 connects with the first chamber 62 via holes 58 formed in the rigid piece 52 and in line with which is arranged a one-way valve 51 identical to the valve 50 and fitted on a finger 57, this valve allowing the product to pass from the chamber 62 to the chamber 61 and preventing it from passing in the opposite direction.

The bottom 11 of the base 7 carries anti-trapping devices 27 whose function, as known per se, is to prevent the walls of a flexible bag 2 from sticking to each other for example in their central zone, and from trapping a quantity of product in the lower part of the bag 2, preventing it from being ejected; the anti-trapping devices 27 advantageously include longitudinal blades integrally molded with the base 7.

The container 4 is equipped with a bottom 5 which includes an orifice for establishing a connection to the outside air.

The bottom 5 has fastening means for a cap 70; in the example illustrated in FIG. 1, these means include a groove 66 into which pegs 71, provided at the internal periphery of the end edge of the cap 70, snap into place. The cap 70 is designed so as to recieve the pump 39 under the same conditions as it is recieved by the base 7; the cap 70 therefore includes parts necessary for this design which are identical to the corresponding parts of the base 7. The cap thus includes, in particular, a rim 78 which is identical to the rim 47, a neck 72 which is identical to the neck 15, and securing means 73 which are identical to the securing means 18. By disconnecting the pump 39 and the cap 70 from the container 4, it is possible to connect together the cap 70 and the pump 39, thus constituting a subunit 80 illustrated in FIG. 2. The present invention therefore provides a "stationary" dispensing unit 1 for use in the home, which can be converted into a "travel" subunit 80 of a considerably reduced size, which can be transported easily in a toiletry bag.

In order to make use of the "stationary" unit 1, the user presses on the dome 56; by virtue of the action of the one-way valve 51, the product contained in the chamber 61 passes along the channel 77 to the outside, the lip 54 being compressed against the rigid piece 52; when the user ceases to press on the dome 56 the lip 54 closes the outlet of the channel 77 again because of its elasticity; as it returns to its original shape which it had when at rest, the dome 56 creates a reduced pressure in the chamber 61, and product enters to refill the chamber 61 from the bag 2 and the chamber 62, passing through the valves 50 and 51.

When the subunit 80 includes the pump 39 and the cap 70, it is used in the same way as described above; its use is, of course, limited to the amount of product present in the chambers 61 and 62 when the pump 39 is disconnected from the unit 1; this limited amount (indicated by 75 in FIG. 2) is sufficient for the dispensing of a few measures of product.

I claim:

1. Unit for dispensing a product of liquid or pasty consistency, comprising:

a receptacle for the product which is equipped with a base to receive a dispensing device, the base and the dispensing device including complementary securing means which enable the base and the dispensing device to be connected and disconnected; and a cap including securing means which are identical to the securing means of the base, wherein the dispensing device and the cap can be connected to form a dispensing subunit.

2. Dispensing unit according to claim 1, wherein the cap is fitted removably on the receptacle.

3. Dispensing unit according to claim 1, wherein the receptacle includes a rigid container and a flexible bag connected to the base, said base being connected to the receptacle.

4. Dispensing unit according to claim 2, wherein the cap is fitted removably on a bottom of the receptacle, the bottom and the cap including complementary fastening means.

5. Dispensing unit according to claim 1, wherein the dispensing device is a diaphragm pump.

6. Dispensing unit according to claim 5, wherein the pump comprises a rigid piece, an elastic diaphragm and a rigid cover, the diaphragm being positioned between the rigid piece and the cover.

7. Dispensing unit according to claim 5, wherein the pump has a cylindrical skirt which, together with the base, defines a first chamber which connects with an inside of the bag via holes formed in the base.

8. Dispensing unit according to claim 7, wherein the skirt is surrounded by a neck of the base, the securing means being carried by the neck and the skirt, respectively.

9. Dispensing unit according to claim 7, wherein the diaphragm forms, at its center, a dome which, together with the rigid piece, defines a second chamber which connects with the first chamber via holes formed in the rigid piece.

10. Dispensing unit according to claim 9, wherein a one-way valve is arranged in line with the holes formed in the rigid piece.

11. Dispensing unit according to claim 9, wherein the rigid piece has an inclined part with a channel formed therein and the diaphragm includes a lip covering the channel, an inner end of the channel opening into the second chamber.

12. Dispensing unit according to claim 5, further comprising a cover provided to close the base, when the pump has been removed from the base, the cover having tongues which interact with a periphery of a one-way valve arranged in line with holes formed in the base so as to apply the valve against a seat, the receptacle; the base and the cover forming a storable product refill.

13. Unit for dispensing a .product of liquid or pasty consistency, comprising:

a receptacle for the product which is equipped with a base to receive a dispensing device, the base and the dispensing device including complementary securing members which enable the base and the dispensing device to be connected and disconnected; and a cap including securing members corresponding to the securing members of the base, wherein the dispensing device and the cap can be connected to form a dispensing subunit.

14. Dispensing unit according to claim 13, wherein the cap is fitted removably on the receptacle.

15. Dispensing unit according to claim 13, wherein the receptacle includes a rigid container and a flexible bag connected to the base, said base being connected to the receptacle.

16. Dispensing unit according to claim 14, wherein the cap is fitted removably on a bottom of the receptacle, the bottom and the cap including complementary fasteners.

17. Dispensing unit according to claim 13, wherein the dispensing device is a diaphragm pump.

18. Dispensing unit according to claim 17, wherein the pump comprises a rigid piece, an elastic diaphragm and a rigid cover, the diaphragm being positioned between the rigid piece and the cover.

19. Dispensing unit according to claim 17, wherein the pump has a cylindrical skirt which, together with the base, defines a first chamber which connects with an inside of the bag via holes formed in the base.

20. Dispensing unit according to claim 19, wherein the skirt is surrounded by a neck of the base, the securing members being carried by the neck and the skirt, respectively.

21. Dispensing unit according to claim 19, wherein the diaphragm forms, at its center, a dome which, together with the rigid piece, defines a second chamber which connects with the first chamber via holes formed in the rigid piece.

22. Dispensing unit according to claim 21, wherein a one-way valve is arranged in line with the holes formed in the rigid piece.

23. Dispensing unit according to claim 21, wherein the rigid piece has an inclined part with a channel formed therein, and the diaphragm includes a lip covering the channel, an inner end of the channel opening into the second chamber.

24. Dispensing unit according to claim 17, further comprising a cover provided to close the base, when the pump is removed from the base, the cover having tongues which interact with a periphery of a one-way valve arranged in line with holes formed in the base so as to apply the valve against a seat; the receptacle, the base and the cover forming a storable product refill.

* * * * *